United States Patent
Srinivasan et al.

(10) Patent No.: US 9,607,273 B2
(45) Date of Patent: Mar. 28, 2017

(54) OPTIMAL TIME TO POST FOR MAXIMUM SOCIAL ENGAGEMENT

(71) Applicant: Adobe Systems Incorporated, San Jose, CA (US)

(72) Inventors: Balaji Vasan Srinivasan, Chennai (IN); Anandhavelu N, Kangayam (IN); Ritwik Sinha, Kolkata (IN); Shriram Revankar, Bangalore South (IN)

(73) Assignee: Adobe Systems Incorporated, San Jose, CA (US)

( * ) Notice: Subject to any disclaimer, the term of this patent is extended or adjusted under 35 U.S.C. 154(b) by 421 days.

(21) Appl. No.: 14/150,666

(22) Filed: Jan. 8, 2014

(65) Prior Publication Data

US 2015/0193685 A1 Jul. 9, 2015

(51) Int. Cl.
| | |
|---|---|
| G06N 3/08 | (2006.01) |
| G06Q 30/02 | (2012.01) |
| H04N 21/25 | (2011.01) |
| G06N 99/00 | (2010.01) |
| H04N 21/466 | (2011.01) |

(52) U.S. Cl.
CPC ............. *G06N 99/005* (2013.01); *G06N 3/08* (2013.01); *G06Q 30/0201* (2013.01); *G06Q 30/0202* (2013.01); *H04N 21/25* (2013.01); *H04N 21/466* (2013.01); *G06Q 30/02* (2013.01)

(58) Field of Classification Search
None
See application file for complete search history.

(56) References Cited

PUBLICATIONS

Chen[10], Short and Tweet: Experiments on Recommending Content from Information Streams. Copyright ACM [online], 2010 [retrieved on Dec. 5, 2015]. Retrieved from the Internet<URL:http://www.google.com/url?sa=t&rct=j&q=&esrc=s&source=web&cd=1&cad=rja&uact=8&ved=0ahUKEwjqjpHOqe7JAhWJXR4KHXkHAv4QFggdMAA&url=http%3A%2F%2Fwww-bd.lip6.fr%2Fens>.*

Nann[13], Predictive Analytics on Public Data—The Case of Stock Markets ECIS 2013 Proceedings. [online], Jul. 1, 2013 [retrieved on Dec. 5, 2015]. Retrieved from the Internet<URL:http://aisel.aisnet.org/cgi/viewcontent.cgi?article=1325&context=ecis2013_cr>.*

Chu et al., (Chu09), Personalized Recommendation on Dynamic Content Using Predictive Bilinear Models, Apr. 20-24, Madrid, Spain [online], 2009 [retrieved on May 31, 2016]. Retrieved from the Internet<URL:http://www2009.eprints.org/70/1/p691.pdf>.*

(Continued)

*Primary Examiner* — Stanley K Hill
*Assistant Examiner* — Nathan Brown, Jr.
(74) *Attorney, Agent, or Firm* — Kilpatrick Townsend & Stockton LLP

(57) ABSTRACT

Computer-implemented methods and systems are disclosed for making a recommending providing a post on a social media forum. One exemplary embodiment involves utilizing machine-learning techniques to produce a model capable of determining optimal post recommendations from various posting factors. The model may be produced from historical post information regarding various posts made by, for instance, marketers on a social media forum and corresponding community interest responses to the posts made by the community of users associated with the social media forum. The model may be provided to a recommendation engine.

17 Claims, 6 Drawing Sheets

(56) References Cited

PUBLICATIONS

Yano et al., (Yano09), Predicting Response to Political Blog Posts with Topic Models The 2009 Annual Conference of the North American Chapter of the ACL, pp. 477-485 ,Boulder, Colorado, Jun. [online], 2009 [retrieved on May 31, 2016]. Retrieved from the Internet<URL:http://www.google.com/url?sa=t&rct=j&q=&esrc=s&source=web&cd>.*

* cited by examiner

OPTIMAL TIME TO POST FOR MAXIMUM SOCIAL ENGAGEMENT

TECHNICAL FIELD

This disclosure relates generally to computer-implemented methods and systems for making recommendations with respect to posting on a social media forum.

BACKGROUND

Social media forums allow participants to interact with one another regarding particular topics and purposes. Individuals and companies can host, join, and/or participate in social media forums to market and facilitate the sale of products and services. Social media forums can provide a platform that allows marketers to quickly interact and reach out to customers in a cost-effective manner. Posting on a social media forum at an advantageous time can be important for multiple reasons. For instance, posting an inappropriate message at an inappropriate time can destroy hard-built brand images. Additionally, the effectiveness of a marketing post can depend upon the timing of the post with respect to a prime time of a social media forum when the community of users associated with the forum is most active. The effectiveness of a marketing post can similarly depend upon the relative timing of other posts (both marketing posts and other posts) as well as other time-dependent factors.

Determining an advantageous time to make a marketing or other type of post can depend on the content of the post, the community, and the community's behavior and activities. The participants in a community may generally favor certain content at certain times of day more than at other times of day. For example, weekend sales announcements might be most effective to a particular community when posted on Friday nights. The same announcement posted on any other day, comparatively, might not garner as much attention.

Current techniques for posting on social media forums do not adequately account for potential differences in the level of interest over time.

SUMMARY

One exemplary embodiment involves receiving historical post information associated with marketing posts presented on a social media forum, the marketing posts having been consumed by a community of users associated with the social media forum. The embodiment further involves determining a model for predicting community interest for a potential post posted in a posting circumstance in which a time-dependent posting factor is applicable, wherein the model is determined based on the historical post information. The embodiment further involves providing the model for use in a recommendation engine.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE FIGURES

These and other features, embodiments, and advantages of the present disclosure are better understood when the following Detailed Description is read with reference to the accompanying drawings.

DETAILED DESCRIPTION

Figure 1:
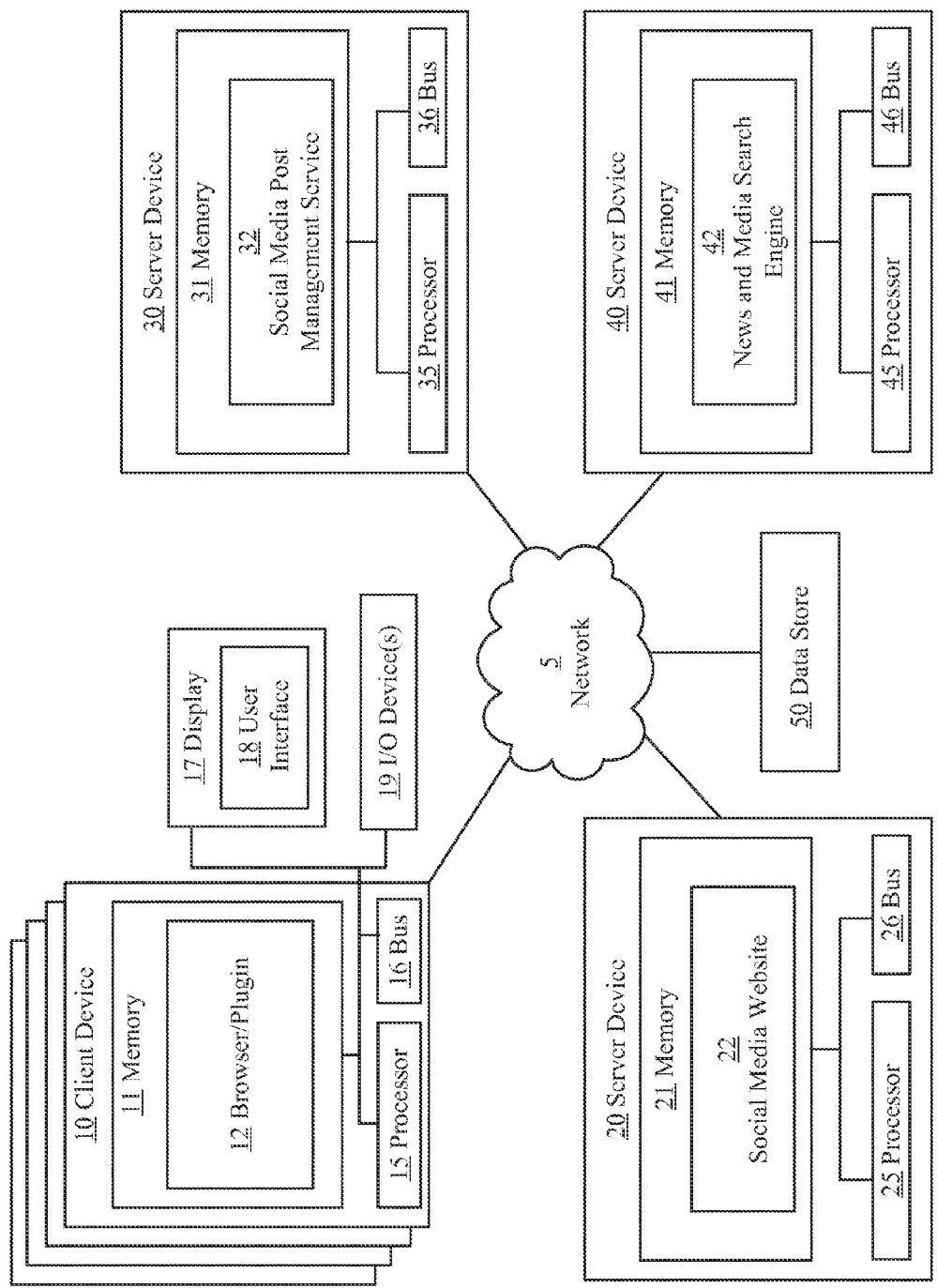
FIG. 1 is a block diagram depicting exemplary computing devices in an exemplary computing environment for implementing certain embodiments.

Various embodiments of the present invention are described hereinafter with reference to the figures. It should be noted that the figures are only intended to facilitate the description of specific embodiments of the invention. They are not intended as an exhaustive description of the invention or as a limitation on the scope of the invention. In addition, an aspect described in conjunction with a particular embodiment of the present invention is not necessarily limited to that embodiment and may be practiced in other embodiments. For instance, though examples are described herein related to marketing techniques, the social media post management service may be used in any suitable field in which a user may require a post to be made on an electronic forum.

Computer-implemented systems and methods are disclosed that facilitate making recommendations with respect to posting on a social media forum. In one embodiment, a recommendation identifies an optimal time to make a post to maximize expected social engagement. A posting recommendation can be determined, based on characteristics of a particular potential post, i.e., posting factors. For example, the potential post may be to post sometime this week a toy train advertisement on a social media forum hosted by the toy's manufacturer. Based on historical information, the expected community response to such a post may be determined to depend upon which day of the week the post is made. A model can be created from historical post information and used to compare the expected response for each of the available posting times within the posting window. In the above example, an expected community response level for a post of the toy train advertisement on the social media forum on Monday may be compared to an expected community response level for a post of the toy train advertisement on the social media forum on Tuesday and compared to an expected community response level for a post of the toy train advertisement on the social media forum on Wednesday, etc. The day of the week with the best-expected response level may be provided as a recommended time to make the proposed post.

One exemplary embodiment involves utilizing machine-learning techniques to produce a classifier or regression model for use in determining post recommendations. Such a model may use historical post information regarding posts made by, for instance, marketers on a social media forum, and corresponding community interest responses to the posts made by the community of users associated with the social media forum. Information about the various posting factors can be compiled using the historical post information. For example, the respective impacts of each of multiple different posting factors on the community response can be estimated. A recommendation model may be determined that includes or is otherwise based on the expected impact of different posting factors on community response. This may include posting factor weight information indicative of the relative impacts of the different factors.

A recommendation engine may use the model to provide posting recommendations for a given potential post. For example, a recommendation engine may receive user input identifying one or more posting factors of a potential post, determine a recommendation regarding the potential post using a model based on historical posting data, and provide that recommendation for display. In at least one embodiment, a user may be enabled to submit content to be included in a potential post. In some cases, this may be an image, a video, a text, or any other suitable content. Additionally, the user may be enabled to specify one or more of the aforementioned posting factors. The user may be required to enter a time-period within which the user wishes to post the potential post. The specified time-period may contain one or more separate posting opportunities during which the post is capable of being displayed. A posting opportunity may include, at least, posting factors such as a time of day and a day of the week.

In at least one embodiment, the recommendation engine may, for each posting opportunity, identify the posting factors associated with the post and the posting opportunity, input the extracted posting factors into the model and receive a recommendation result. The recommendation engine may then display to the user, the best recommendation result, or enable the user to select a preferred recommendation from a list.

As used herein, the phrase "social media forum" refers to a website or application that enables the creation and exchange of user-generated content. Examples of social media forums include, but are not limited to, websites utilized for micro-blogging, social networking, social bookmarking, podcasts, and social blogging, to name a few.

As used herein, the phrase "post" refers to the act of sharing user-generated information on a social media forum.

As used herein, the phrase "marketing post" refers to user-generated information presented in a post that relates to planning, pricing, coordinating, promoting, selling, and/or distribution of an idea, good, or service in the marketplace.

As used herein, the phrase "historical post information" refers to information about posts presented on a social media forum, the posts having been consumed by a community of users associated with the social media forum. The historical post information may also include information about posting factors associated with previously presented posts and community response information.

As used herein, the term "posting factor" is used to describe any characteristic of a post's content or posting circumstances, whether time-dependent or otherwise. In at least one example, time-dependent posting factors may include, but are not limited to, time posted, day posted, time since author's last post, time since last post of the same category, number of posts within a given time-period, and length of time that the content of the post has been advertised, to name a few examples. Other posting factors may include, but are not limited to, post description, post sentiment, post category, author, length of the post, content of the post, and preferred type of community response.

The phrases "community response" and "community interest" refer to responses made to a post on a social media forum by users of the forum. Community response information and community interest information may include values indicating a particular action taken by a community of users. For instance, the user may select a button indicating that he or she "likes" a post. Additionally, the user may "re-share" the post in some other social media forum or via text or electronic mail. The user might respond to the post directly by creating and posting a comment associated with the post or separately posting a comment regarding similar subject matter as the original post. If the original post has a hyperlink that is accessible to users, one type of community response information might include the number of hyperlink selections accessed by the community of users. The aforementioned examples are illustrative in nature; it should be understood that any suitable measure of community response may be used. For instance, one method of measurement may be the use of key performance indicators (KPIs). KPIs may include any suitable information describing community engagement with the post that may be used to assess the post's performance with regards to the forum. For instance, a user may interact with a post in various ways, including, but not limited to, clicking a "like" button associated with the post, sharing the post via a personal page of the forum, sharing the post via a different forum entirely, and/or commenting on the post by entering text to be associated with the post. Any of the aforementioned examples, or any suitable user interaction with the post, may be measured and used to calculate a key performance indicator of the post.

The preceding non-limiting examples were provided to introduce the general subject matter of this patent. The following examples and the associated Figures relate to additional non-limiting examples to further illustrate one or more aspects of one or more embodiments disclosed in this patent.

Referring now to the drawings, FIG. 1 is a block diagram depicting exemplary computing devices 10, 20, 30, and 40 in an exemplary computing environment for implementing certain embodiments. Applications and other electronic content execute or are otherwise used on the exemplary computing devices 10, 20, 30, and 40 and are shown as functional components or modules. Server device 20, illustrated in FIG. 1, may be configured by itself or in combination with other server devices to provide a social media website. The server device 30, illustrated in FIG. 1, may be configured by itself or in combination with other server devices to provide a social media post management service 32. Applications and other electronic content execute or are otherwise used on the exemplary computing devices 10, 20, 30, and 40 and are shown as functional components or modules. As is known to one of skill in the art, such applications and content may be resident in any suitable non-transitory computer-readable medium and execute on any suitable processor.

While the network 5 shown in FIG. 1 may comprise the Internet, in other embodiments, other networks, such as an intranet, or no network may be used. Moreover, methods may operate within a single device. Exemplary computing devices 10, 20, 30, and 40 can be connected to a network 5 as shown. Alternative configurations are of course possible.

Computing devices 10, 20, 30, and 40 may comprise a computer-readable medium such as a random access memory (RAM) 11, 21, 31, and 41 coupled to processor 15, 25, 35, and 45, respectively. The processor 15, 25, 35, and 45 may execute computer-executable program instructions and/or accesses information stored in memory 11, 21, 31, and/or 41. Any processor described herein may comprise a microprocessor, an ASIC, a state machine, or other processor, and can be any of a number of computer processors. Such a processor can comprise, or may be in communication with a computer-readable medium which stores instructions that, when executed by the processor, cause the processor to perform the steps described herein.

A computer-readable medium may comprise, but is not limited to, an electronic, optical, magnetic, or other storage or transmission device capable of providing a processor with computer-readable instructions. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. A computer-readable medium may transmit or carry instructions to a computer, including a router, private or public network, or other transmission device or channel, both wired and wireless. The instructions may comprise code from any suitable computer-programming language, including, for example, C, C++, C#, Visual Basic, Java, Python, Perl, and JavaScript.

Computing devices 10, 20, 30, and 40 may be any computing or other electronic equipment that executes instructions and includes any type of processor-based equipment that operates an operating system or otherwise executes instructions. A device will typically include a processor (e.g., processor 15, processor 25, processor 35, or processor 45) that executes program instructions and may include external or internal components such as I/O devices 19 (e.g., a mouse, a CD-ROM, DVD, a keyboard, a display, or other input or output equipment). Examples of devices are personal computers, digital assistants, personal digital assistants, cellular phones, mobile phones, smart phones, pagers, digital tablets, laptop computers, Internet appliances, other processor-based devices, and television viewing devices. Exemplary devices 10, 20, 30, 40 are respectively used as special purpose computing devices to provide specific functionality offered by their respective applications and by the interaction between their applications. As an example, device 10 is shown with a display 17, having a user interface 18 and various I/O devices 19. A bus, such as bus 16, bus 26, bus 36, or bus 46, will typically be included in a device as well. Each device 10, 20, 30, and 40 may communicate via network 5, the network comprising a public or private network.

In one example, client device 10 is a laptop computing device configured for web browsing via browser/plugin application 12. Browser/plugin application 12 may be a native application that runs outside of a browser context. In contrast, browser/plugin application 12 may be provided as one or more Hyper Text Markup Language (HTML) files, eXtensible Markup Language (XML) files, Javascript files, SWF files of Microsoft Silverlight® compatible rich Internet application files, or files having any other format or combination of formats. The laptop may include a browser with a Microsoft Silverlight® plugin media player that provides an application framework for executing a Microsoft Silverlight® compatible rich Internet application stored as browser/plugin application 12 to provide the visual appearance and interactive functionality of the browser/plugin application 12. The browser/plugin application 12 may request and/or receive information social media website server application 22 on server device 20. Additionally, the browser/plugin application 12 may request and/or receive information social media post management service 32 on server device 30.

Server device 20, illustrated in FIG. 1, may be configured by itself or in combination with other server devices to provide a social media website. Server device 20 may comprise memory 21, a processor 25, and a bus 26, and may have a social media website server application 22 stored in memory 21 that is executed by the processor 25 to provide the social media website server functionality. The social media website server application 22 may expose API functions that are called by an application such as browser/plugin application 12 on client device 10 or social media post management service 32 on server device 30.

The server device 30, illustrated in FIG. 1, may be configured by itself or in combination with other server devices to provide a social media post management service. The server device 30 may comprise memory 31, a processor 35, and a bus 36, and may have a social media post management service 32 stored in memory 31 that is executed by the processor 35 to provide the social media post management service functionality. The social media post management service 32 may expose API functions that may be called by an application such as browser/plugin application 12 on client device 10.

The exemplary devices illustrated in FIG. 1 provide an example configuration in which the exemplary social media post management service can be provided. Other configurations may be used with modifications, additions, and deletions to address the particular circumstances in which a particular system is used. For example, in one alternative configuration all historical post information is stored in a storage location on a server device 30 or another device other than server device 20 or data store 50.

In accordance with at least one embodiment the social media post management service 32, located in memory 31 on service device 30, may be configured to interact with social media website server application 22. located in memory 21 on server device 20, or alternatively, with data store 50 to obtain historical post information associated with posts made via the social media website server application 22. Data store 50 may be any suitable storage capable of storing files and information of the sort used for posting on social media forums. Additionally, social media post management service 32 may be configured to interact with server device 40 to obtain news and media information from news and media search engine 42, located in memory 41, the news and media information pertaining to posts made via social media website server application 22.

The server device 40, illustrated in FIG. 1, may be configured by itself or in combination with other server devices to provide a news and media search engine 42. The server device 40 may have the news and media search engine 42 stored in memory 41 that is executed by the processor 45 to provide news and media search engine functionality. The news and media search engine 42 may expose API functions that may be called by an application such as social media post management service 32 located on server device 30.

Embodiments disclosed herein provide various features that enable posting recommendations for posts on a social media forum. The following examples illustrate some of these features.

Figure 2:
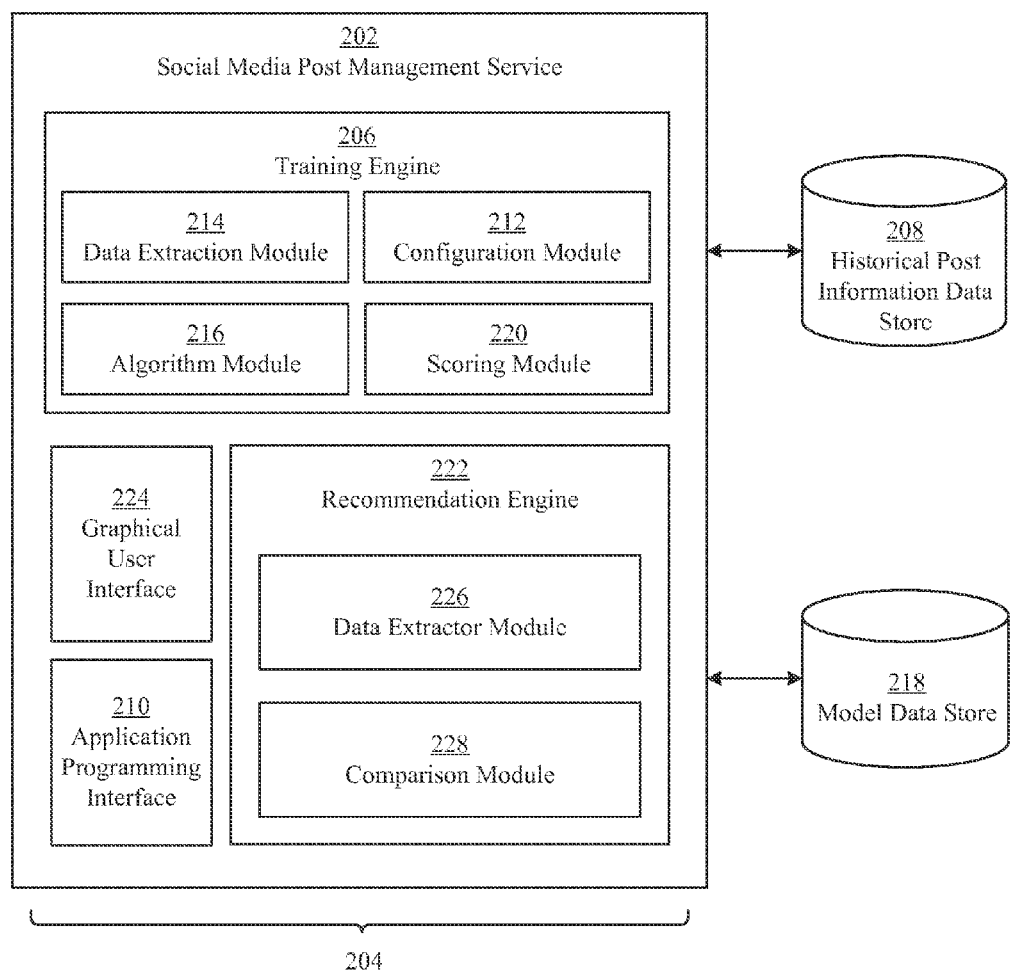
FIG. 2 is a schematic illustrating an example computer architecture for the social media post management service including a plurality of modules that may carry out various embodiments.

FIG. 2 is a schematic illustrating an example computer architecture 200 for the social media post management service 202 (e.g., the social media post management service 32, FIG. 1) including a plurality of modules that may carry out various embodiments. The modules 204 may be software modules, hardware modules, or a combination thereof. If the modules 204 are software modules, the modules 204 can be embodied on a computer readable medium and processed by a processor in any of the computer systems described herein. It should be noted that any module or data store described herein, may be, in some embodiments, a service responsible for managing data of the type required to make corresponding calculations. The modules may be configured in the manner suggested in FIG. 2 or may exist as separate modules or services external to the social media post management service 202.

In at least one embodiment, a method is enabled for obtaining a time recommendation to post on a social media forum such that community responses are optimized. For example, a social media post management service 202 may include a training engine 206. The training engine 206 may be responsible for interacting with other server applications or modules or, in this example, a historical post information data store 208, in order to obtain historical post information associated with posts made on a particular social media forum or multiple social media forums. Training engine 206 may conduct this interaction via application programming interface 210. Training engine 206 may further include configuration module 212 that may be configured to receive user preferences via application programming interface 210. Received user preferences may specify what type of optimization the user requires. For example, a user may specifically desire an optimization that maximizes the number of times users will comment on the post over, for instance, the number of times users will indicate that they approve of, or "like," the post. A user may make this specification via graphical user interface 224, an interface provided to the user by the social media post management service 202. Alternatively, an optimization preference indicating a preferred type of community response, or model preference scheme indicating a ranking of optimization type preferences, may be loaded at startup or at any suitable time. The configuration module 212 may receive and store such information for future preference decisions.

In at least one embodiment, once the historical post information is received, data extraction module 214, a module of training engine 206, may extract various posting factors associated with each post contained in the received historical post information. As described above, the various posting factors may include, but are not limited to, time posted, day posted, post description, post sentiment, post category, author, time since author's last post, time since last post of the same category, length of the post, content of the post, number of posts with a given time-period, length of time that the content of the post has been advertised, and indication of public interest.

In at least one embodiment, algorithm module 216, a module of training engine 206, may be responsible for managing one or more algorithms that may be used to create at least one model, the model learned from the historical post information. In at least one example, the model is determined based only on the historical post information that is specific to a particular social media forum without being based on historical post information associated with different social media forums. The algorithm module 216 may interact with the configuration module 212 to determine an appropriate algorithm to use in creation of the model. Alternatively, the models may be selected automatically by the systems using standard error metrics. Once selected, the extracted posting factors may be used as input in the selected algorithm and the resulting model may be stored in model data store 218. Prior to storage, or subsequent to storage, the model may be scored by scoring module 220, a module of training engine 206. Scoring module 220 may score the model created with respect to each type of community response. The model score may be associated with the model and stored in, for example, model data store 218.

In at least one example, multiple algorithms may be utilized to create multiple models to be stored in model data store 218. These models may be scored in a similar manner as described above to indicate how effective the model is at predicting one or more particular types of community responses. Using multiple models may enable identification of a model which performs best for the particular social media forum and the associated community of users, rather than a universal model that is selected regardless of the community and forum.

In accordance with at least one embodiment, a recommendation engine 222, a module of the social media post management service 202, may be responsible for providing a recommendation to a user suggesting an optimal time to post on a social media forum. In at least one example, the user may be provided a graphical user interface 224, an interface provided by the social media post management service 202. A user may utilize graphical user interface 224 to input information pertaining to a potential post. For instance, the user may submit a recommendation request indicating, for instance, a time window as well as information about the post. In one illustrative example, a user may submit a recommendation request, via graphical user interface 224, indicating that he wishes to post a potential post within the next three days via a particular social media forum. Alternatively, the recommendation request containing the potential post may be received via application programming interface 210 as a service or function call made from an external source, external with respect to the social media post management service 202. As a non-limiting example, the potential post may be related to an advertisement for a child's bicycle. The social media forum may be a social media website associated with a retail business. Once the recommendation request is received via graphical user interface 224 or application programming interface 210, it may be received by data extractor module 226, a module of recommendation engine 222.

The recommendation request received by data extractor module 226 may be processed and various posting factors associated with the potential post, as well as the posting opportunity, may be extracted. For instance, metadata associated with the post may indicate that the content of the post includes an image. Furthermore, post metadata may indicate the author of the post, the post category (e.g., "text", "image"), and the time since the author last posted. In this example, the recommendation request indicates a posting window of three days within which multiple posting opportunities may be utilized to display the post. For each posting opportunity within the time window, the data extractor module 226 may extract, at least, the time of day and day of the week.

In at least one embodiment, comparison module 228, a module of recommendation engine 222, may be configured to receive the extracted posting factors regarding the potential post and potential posting opportunity. Comparison module 228 may then obtain a suitable model from model data store 218 with which to compare the received posting factors. Selection of the suitable model may include comparing a preferred type of community response indication received from the recommendation request to scores associated with models in the model data store 218. Perhaps the recommendation request indicates that user comments are preferred over other types of community responses. In this case, a model may be selected that optimizes for user comments. Once the model is determined, comparison module 228 may input the extracted posting factors into the determined model to obtain a value indicating a predicted amount of community interest. This process may be repeated in order to determine multiple predicted community interest values corresponding to posting the potential post at each posting opportunity. In at least one example, comparison module 228 may cause to display the highest-scored prediction as a recommendation to the user, or alternatively, may select and return the highest-scored prediction. In other examples, the comparison module 228 may cause the scored predictions to be ranked and displayed to the user in accordance with the ranking such that the user may make an informed selection between predictions.

Figure 3:
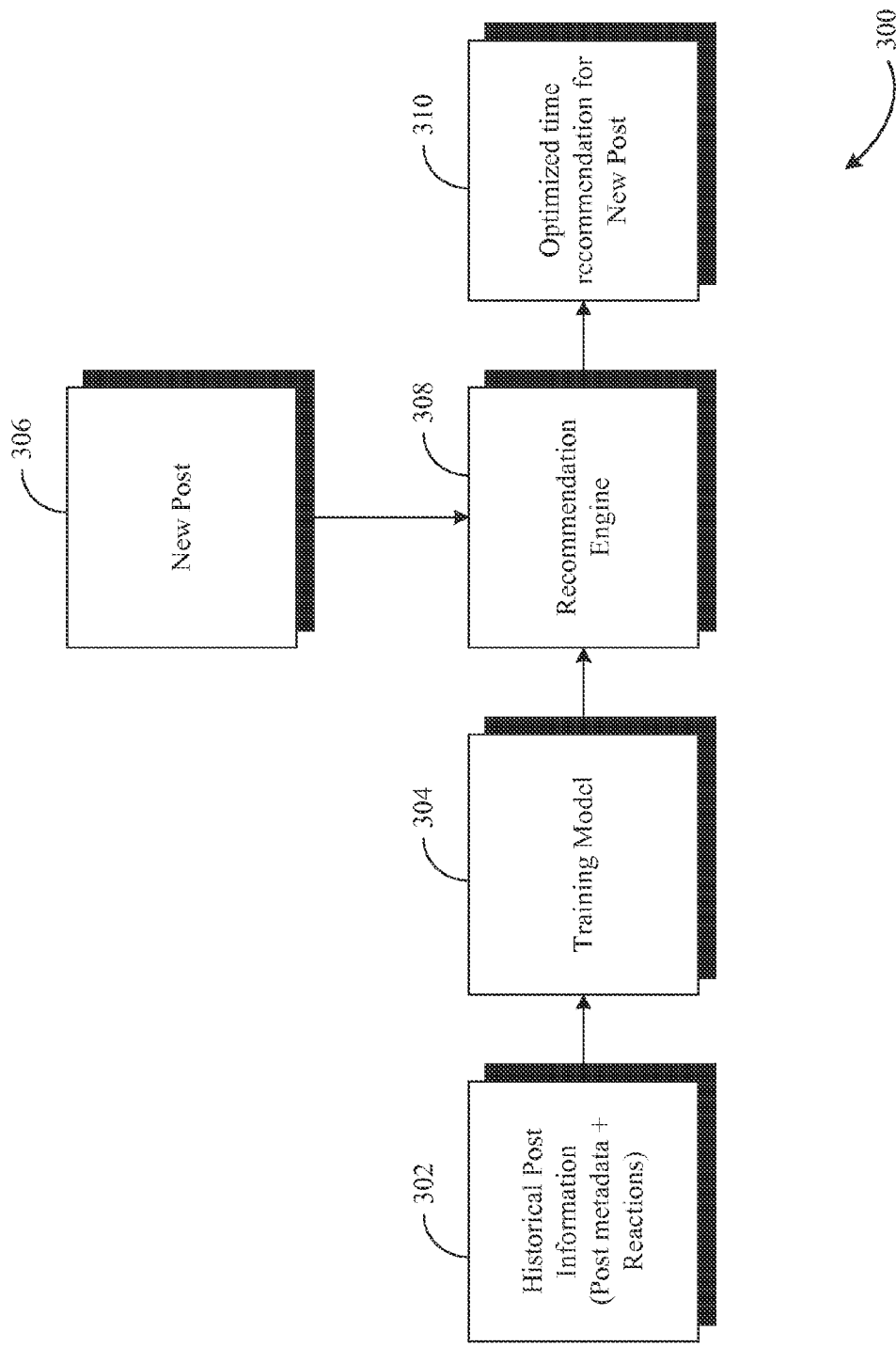
FIG. 3 is a flow chart illustrating an exemplary method for utilizing the social media post management service, in accordance with at least one embodiment.

FIG. 3 is a flow chart illustrating an exemplary method 300 for utilizing a social media post management service (e.g., the social media post management service 202, FIG. 2), in accordance with at least one embodiment. In a similar manner as discussed above, historical post information, including posting factors and community response information, may be received at 302. At 304, a training module (e.g., the training engine 206, FIG. 2) extracts posting factors of each post included in the historical post information along with information pertaining to community responses associated with each post. Once posting features are extracted, the training module determines one or more machine-learning algorithms to utilize to create one or more recommendation models.

In the current example, new post information is entered by a user at 306. The new post information may contain various posting factors as described in detail above. The new post information is received by a recommendation engine (e.g., the recommendation engine 222, FIG. 2) at 308. The recommendation engine may use the posting factors as input for the previously created model(s). The model(s) may then output an optimized time recommendation for the new post at 310.

Figure 4:
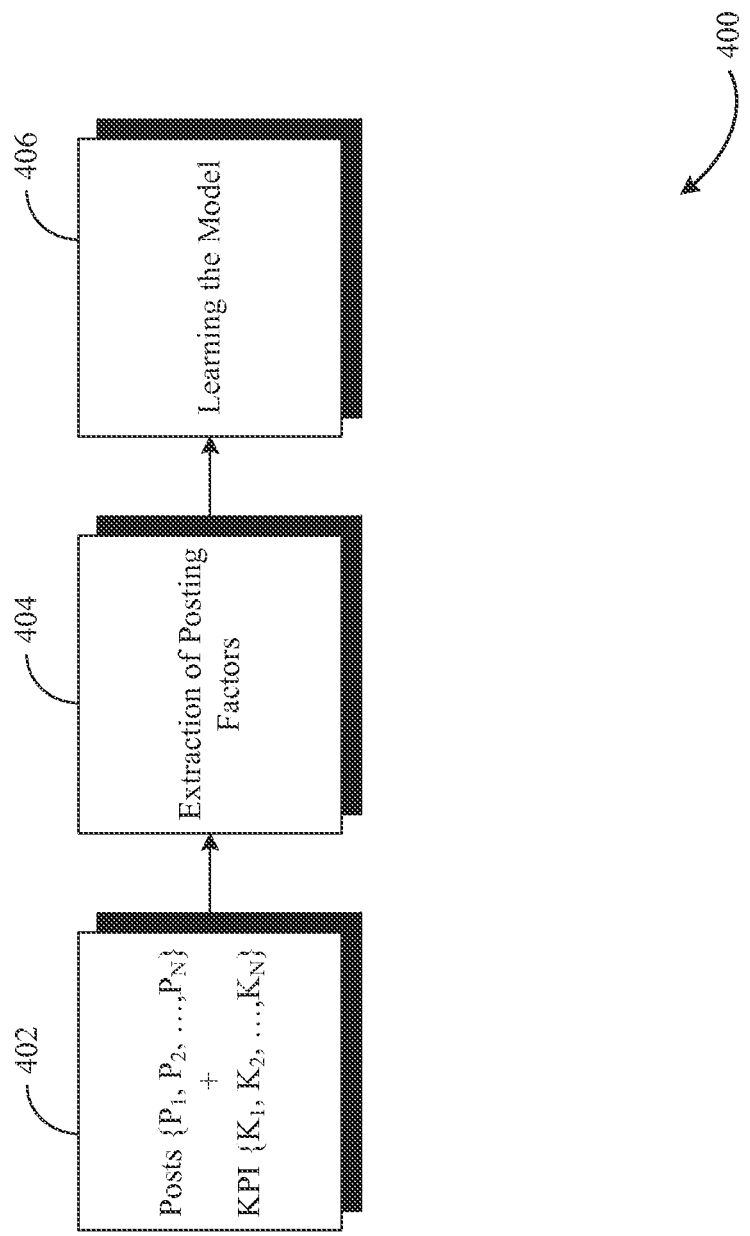
FIG. 4 is a flow chart illustrating an exemplary method for utilizing the social media post management service, in accordance with at least one other embodiment.

FIG. 4 is a flow chart illustrating an exemplary method for utilizing the social media post management service, in accordance with at least one other embodiment. In at least one example, a training phase 400 may be used to learn a recommendation model. Training consists of gathering historical posts that may be used as data to generate the recommendation model. The method may begin at 402, where a social media post management service (e.g., the social media post management service 202, FIG. 2) may receive historical post information including one or more posts associated with one or more key performance indicators (KPIs) at 402. KPIs may include community responses to each of the historical posts. Once received, various posting factors may be extracted the historical post information at 404.

In at least one example, posting factors may include content-based features of the post. For example, a content-based feature of a post may include a sentiment score of a post as measured by a sentiment classifier. A sentiment classifier analyzes text to determine if the text is intended to communicate a positive or negative sentiment. For instance, a positive sentiment may be indicated by the phrase "this is a great product!" while a negative post may be indicated by the phrase "worst toy ever." Thus, a post with a relatively high sentiment score may indicate a high level of confidence that the post is positive in nature. A relatively low sentiment score may indicate a high level of confidence that the post is negative in nature, while an average score may indicate a level of uncertainty as to whether the post is positive or negative in nature.

As an additional example, posting factors may include post time-based features. For example, a posting factor may be the time at which the post was posted and/or the day the post was posted. Post frequency-based features may be included in the posting factors including, but not limited to, the time elapsed since a most recent post, the number of posts in a specified time-period (e.g., the preceding 24 hours), the frequency with which the post author posts to the particular social media forum, to name a few. Posting factors may also include post-based features such as the length and type of the post. Post types may indicate a particular category (e.g., an image, a video) to which the post belongs. Additionally, trend-based features may be included as posting factors. Trend-based features indicate a degree of public interest associated with the post. Consider, as an example, a circumstance where a post is made advertising a child's bicycle. At the time of the post, the bicycle was currently being featured on several news articles and media site videos promoting the toy. The determination that the bicycle is a popular item may be calculated based on its appearance in the news articles and media site videos. An indicator of this public interest may be stored as a posting factor associated with the post to be used, for instance, in calculating a recommendation model.

As indicated at 402, a post may be associated with 1 to N posting factors which may be any combination of the aforementioned posting factors. Additionally, KPIs may be associated with each post. In at least one embodiment, the historical post information containing the posts and KPIs may be received and extracted by the social media post management service at 404. The extracted information may be inputted into one or more machine-learning algorithms. Through such input, one or more models may be learned at 406 to be used later in a recommendation engine as described above.

For instance, the training engine (e.g., the training engine 206) may utilize a random forest algorithm to create a recommendation model. A random forest algorithm is an ensemble learning method for classification and regression that operates by constructing a multitude of decision trees at training time. To classify a new object from input, the input is used to traverse each of the trees in the forest. Each tree gives a classification, and the tree "votes" for the input. The forest chooses the classification having the most votes over all the trees in the forest.

In at least one example, posting factors may be extracted from a portion of the historical posts. A subset of the extracted posting factors may be input into the random forest algorithm and multiple decision trees may be generated each of the subset of posting factors representing a decision node within each tree. Each tree may be formed by randomly choosing one of the subset of posting factors from which to base a decision at each node. Accordingly, each of the decision trees may have a different configuration of decision nodes. Posting factors of the remaining historical posts may be used as input to traverse each tree. As a result of the traversal, each tree may make a vote as to whether the posting factors resulted in a favorable community response or a negative community response. These votes may be used to estimate the error of each tree by comparing the tree vote to community responses associated with each of the historical posts. The forest may choose an overall determination of favorability based on the higher number of either favorable or negative votes.

In at least one example, when a prediction is needed, posting factors may be extracted from the new post. Consider the case where time of day and day of week have not been provided in a post request but the request includes a posting window of the next three days. Various time and day combinations within the window may be generated and each combination, along with the extracted posting factors may be used as input in order to traverse each tree in the forest. Each tree may make a vote as to whether the combination will result in a favorable community response or a negative community response. The combination having the highest positive votes may be selected as a recommendation. Alternatively, a number of combinations having the highest positive votes may be selected as recommendations.

In at least one example, the training engine may utilize a maximum entropy machine-learning algorithm to create a recommendation model. Maximum entropy models the response by assigning probabilities based on the principle of maximum entropy that states that the correct distribution is that which maximizes entropy or "uncertainty" subject to the constraints represented by the evidence (training data). A maximum entropy model is a model that may be used to predict the probabilities of the different possible outcomes of a categorically distributed dependent variable, given a set of independent variables.

In at least one example, posting factors may be expressed as constraints in terms of unknown probability distributions. One such constraint may be that the sum of the unknown probability distributions is 1. Another constraint may involve an average value of some quantity, in one example, an average number of comments made to a particular post of the historical posts. A variable of probability distributions for a particular posting factor may then be expressed in terms of a set of probability distributions related to the remaining posting factors, thus, eliminating the set of probability distributions. Entropy may then be expressed in terms of the particular posting factor. The value of the particular posting factor for which entropy is the largest is calculated. The result is a probability distribution that is consistent with the posting factor constraints but which has the largest possible uncertainty.

In at least one example, when a prediction is needed, extracted posting factors associated with the potential posts are input into the probability distribution. Some potential posting factors may be generated. For instance, perhaps a time-frame in which the potential post is to be posted. For each posting opportunity, the time and day of the posting opportunity, along with the extracted posting factors of the potential post, may be input into the probability distribution. Each input may result in a probability as to whether the potential post will result in a positive community response. The combination of time and day, along with the extracted posting factors, resulting in the highest probability of positive community response may be selected as the recommendation.

Though random forest and maximum entropy are used as example algorithms, any suitable standard classification or regression machine-learning algorithms may be used.

Figure 5:
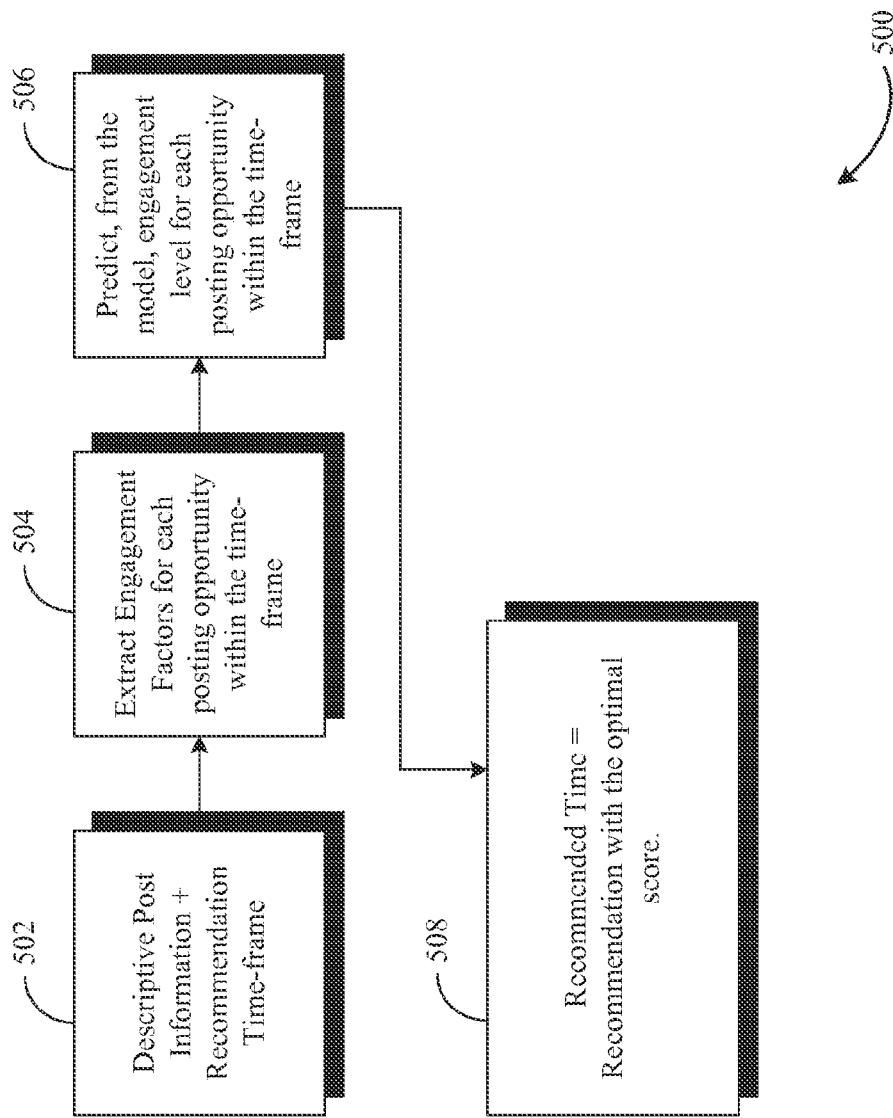
FIG. 5 is a flow chart illustrating an exemplary method for utilizing the social media post management service, in accordance with at least one further embodiment.

FIG. 5 is a flow chart illustrating an exemplary method 500 for utilizing the social media post management service (e.g., the social media post management service 202, FIG. 2), in accordance with at least one further embodiment. The information regarding a potential post and a recommendation time-frame may be received by the social media post management service at 502 via a recommendation request. The social media post management service 202 may extract posting factors from the recommendation request for each posting opportunity within the indicated time-frame at 504.

In one non-limiting example, perhaps the recommendation request indicates a time-frame of the next seven days. Further, perhaps each day there are two posting opportunities, one opportunity occurring in the morning and another opportunity occurring in the evening. Thus, within the specified time-frame there may be fourteen posting opportunities. Posting factors associated with posting opportunities may include the time and day of the posting opportunity. For each posting opportunity, posting factors associated with the potential post as well as the posting factors associated with the posting opportunity are used to determine, utilizing a previously created recommendation model, a predicted engagement level for each posting opportunity within the time-frame at 506.

In the current example, it may be the case that a community of users associated with the specified social media forum has responded favorably to posts made in the evening regardless of the type or content of the post. Furthermore, the community of users may have also responded to posts concerning toys with significant interest on Fridays and Saturdays. Consider further, that the same community of users responds with less interest when posts regarding toys are made on consecutive days of the week. This information, having been incorporated in a recommendation model upon creation of the model, may similarly be taken into account when inputting recommendation request data. The input of this recommendation request data may result in multiple recommendation times being returned, each recommendation time having an associated score indicating an amount of predicted community interest. An optimal score, in some cases a highest-scoring recommendation time, may be selected at 508 and presented to the user, or alternatively, returned. Though this example selects the highest-scoring recommendation, it should be understood that the recommendation displayed to the user may include multiple recommended post times, in some examples scored and displayed to the user based on the scores. Such a method enables the user to select, from the multiple recommended post times, the post time most desired by the user.

Figure 6:
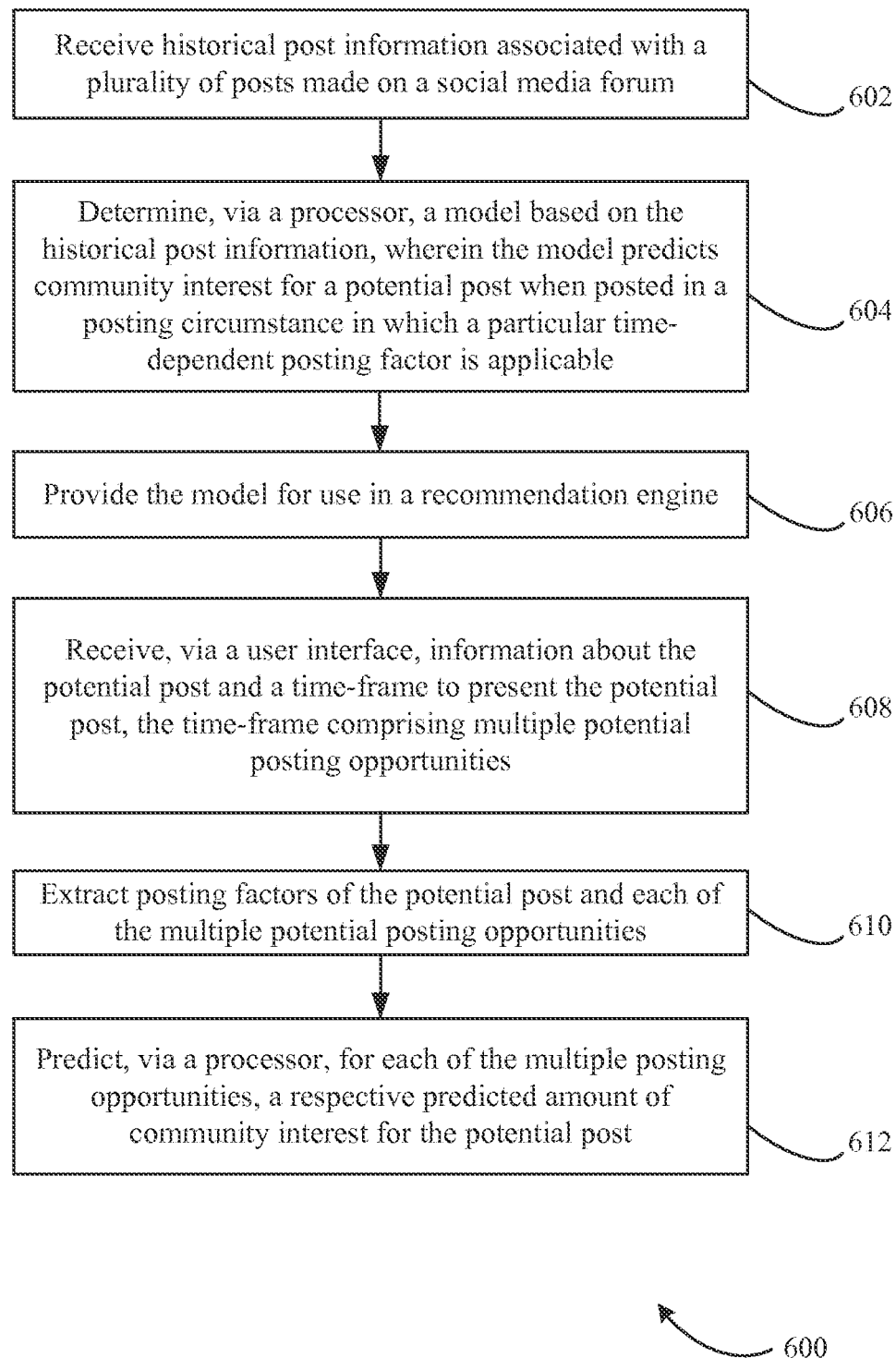
FIG. 6 is a block diagram depicting an exemplary method for utilizing the social media post management service, in accordance with still one further embodiment.

FIG. 6 is a block diagram depicting an exemplary method 600 for utilizing the social media post management service, in accordance with still one further embodiment. The exemplary method 600 may be performed by any suitable computing device and/or application. For example, exemplary method 600 could be performed by social media post management service (e.g., social media post management service 202) of FIG. 2.

The exemplary method may begin at block 602, where historical post information is received, the historical post information associated with a plurality of posts made on a social media forum.

At block 604, a model may be determined, based on the historical post information, where the model may predict community interest for a potential post when posted in a posting circumstance in which a particular time-dependent posting factor is applicable. Examples of time-dependent posting factors include, but are not limited to, time of post, day of post, times since a post was last posted on the social media forum, to name a few. The determined model may be provided to a recommendation engine at block 606.

At block 608, information about the potential post and a time-frame to present the potential post may be received, the time-frame comprising multiple potential posting opportunities. Social media post management service 202 may extract posting factors of the potential post and each of the multiple potential posting opportunities at block 610. At block 612, the social media post management service 202 may predict, for each of the multiple posting opportunities, a respective predicted amount of community interest for the potential post.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

The invention claimed is:

1. A computer-implemented method, comprising:
   receiving historical post information associated with marketing posts presented on a social media forum;
   training, via a processor, a model for predicting community interest for a potential post posted in a posting circumstance in which a combination of posting factors is applicable, including a time-dependent posting factor, the model being trained based on the historical post information, wherein the time-dependent posting factor is at least one of: (i) a time of day or (ii) a time elapsed between a first post and a second post; and
   providing the model for use in a recommendation engine.

2. The computer-implemented method of claim 1, wherein:
   an additional posting factor is a post category; and
   the model provides varying predictions of community interest for the potential post based on a particular marketing category associated with the potential post.

3. The computer-implemented method of claim 1, wherein:
   an additional posting factor is an expected degree of public interest; and
   the model provides varying predictions of community interest for the potential post based on the degree of public interest associated with the potential post.

4. The computer-implemented method of claim 1, wherein:
   an additional posting factor is metadata associated with the potential post; and
   the model provides varying predictions of community interest for the potential post based on the metadata associated with the potential post.

5. The computer-implemented method of claim 1, wherein the model is trained based only on the historical post information that is specific to the social media forum without being based on historical post information associated with different social media forums.

6. The computer-implemented method of claim 1, further comprising using a classifier model or a regression model with input comprising the historical post information and community response information to predict community interest for the potential post.

7. The computer-implemented method of claim 6, wherein the classifier model or the regression model comprises a machine-learning algorithm that includes at least one of a random forest algorithm, a maximum entropy algorithm, a standard regression, and a standard classification algorithm.

8. The computer-implemented method of claim 6, further comprising:
   training, via a processor, multiple classifier or regression models, the multiple classifier or regression models each predict a respective community interest prediction for the potential post posted in a respective posting circumstance;
   scoring each of the multiple classifier or regression models based at least in part on optimizing for a particular type of community interest; and
   selecting a highest-scoring model of the multiple classifier or regression models with a highest score, the highest-scoring model is utilized to predict community interest for the potential post.

9. A system, comprising:

at least one processor;

a training module configured, when executed by the at least one processor, to, at least:

receive historical post information associated with a plurality of posts made on a social media forum;

train, via a processor, a model based on the historical post information, the model predicts community interest for a potential post when posted in a posting circumstance in which a combination of posting factors is applicable, including a time-dependent posting factor that is at least one of: (i) a time of day or (ii) a time elapsed between a first post and a second post; and provide the model for use in a recommendation engine.

10. The system of claim 9, wherein historical post information includes at least one post, the at least one post associated with the time-dependent posting factor and a particular degree of interest demonstrated by the community of users with respect to the at least one post.

11. The system of claim 9, further comprising:

a recommendation module configured, when executed by the at least one processor, to, at least:

receive, via a user interface, information about the potential post and a time-frame to present the potential post, the time-frame comprising multiple potential posting opportunities;

extract posting factors of the potential post and each of the multiple potential posting opportunities; and predict, via a processor, for each of the multiple posting opportunities, a respective predicted amount of community interest for the potential post.

12. The system of claim 11, wherein the recommendation module is further configured to:

use a particular posting opportunity to post the potential post, the particular posting opportunity having a best predicted amount of community interest with respect to the predicted amounts.

13. The system of claim 11, wherein the recommendation module is further configured to, at least:

score the multiple posting opportunities based on predicted amounts of community interest; and based at least in part on the scores, display the multiple posting opportunities.

14. A non-transitory computer-readable medium having thereon executable instructions that, when executed by at least one processor, cause at least one computer to, at least:

receive historical post information associated with a plurality of posts made on a social media forum;

training, via the processor, a model based on the historical post information, the model predicts community interest for a potential post in a posting circumstance in which a combination of posting factors is applicable, including a time-dependent posting factor that is at least one of: (i) a time of day or (ii) a time elapsed between a first post and a second post; and provide the model for use in a recommendation engine.

15. The non-transitory computer-readable medium of claim 14, wherein historical post information includes at least one post, the at least one post associated with the time-dependent posting factor and a particular degree of interest demonstrated by the community of users with respect to the at least one post.

16. The non-transitory computer-readable medium of claim 14, having further executable instructions that, when executed by the at least one processor, cause the at least one computer to, at least:

provide a user interface for the recommendation engine;

receive, via a user interface, information about the potential post and a time-frame to present the potential post, the time-frame comprising multiple potential posting opportunities;

extract posting factors of the potential post and each of the multiple potential posting opportunities;

compare, via a processor, the extracted posting factors to the model; and based on the comparison determine, for each of the multiple posting opportunities, a respective predicted amount of community interest for the potential post.

17. The non-transitory computer-readable medium of claim 14, having further executable instructions that, when executed by the at least one processor, the cause at least one computer to, at least:

score the multiple posting opportunities based on determined predicted amounts of community interest; and based at least in part on the scores, display the multiple posting opportunities.

* * * * *